(12) United States Patent
Fukushima et al.

(10) Patent No.: US 12,090,783 B2
(45) Date of Patent: Sep. 17, 2024

(54) BEARING DEVICE FOR VEHICLE WHEEL

(71) Applicant: NTN Corporation, Osaka (JP)

(72) Inventors: Shigeaki Fukushima, Shizuoka (JP); Natsuko Nagai, Shizuoka (JP)

(73) Assignee: NTN Corporation, Osaka (JP)

( * ) Notice: Subject to any disclaimer, the term of this patent is extended or adjusted under 35 U.S.C. 154(b) by 409 days.

(21) Appl. No.: 17/439,877

(22) PCT Filed: Mar. 19, 2020

(86) PCT No.: PCT/JP2020/012368
§ 371 (c)(1),
(2) Date: Sep. 16, 2021

(87) PCT Pub. No.: WO2020/196291
PCT Pub. Date: Oct. 1, 2020

(65) Prior Publication Data
US 2022/0176739 A1    Jun. 9, 2022

(30) Foreign Application Priority Data

Mar. 25, 2019  (JP) .................................. 2019-057107

(51) Int. Cl.
*B60B 27/00* (2006.01)
*F16C 19/18* (2006.01)

(52) U.S. Cl.
CPC ...... *B60B 27/0094* (2013.01); *B60B 27/0005* (2013.01); *F16C 19/183* (2013.01);
(Continued)

(58) Field of Classification Search
CPC ... B62D 7/18; B60B 27/0094; B60B 27/0005; B60B 27/00; B60B 27/0047; F16C 19/183; F16C 2326/02
See application file for complete search history.

(56) References Cited

U.S. PATENT DOCUMENTS 6,146,022 A *  11/2000  Sahashi ................. F16C 19/187
                                                    384/625
6,296,321 B1*  10/2001  Mizukoshi .......... B60B 27/0094
                                                    301/105.1
(Continued)

FOREIGN PATENT DOCUMENTS

CN        1862043       11/2006
CN      201535323        7/2010
(Continued)

OTHER PUBLICATIONS

Notice of Reasons for Refusal issued Jun. 13, 2023 in corresponding Japanese Patent Application No. 2019-057107, with English language translation.

(Continued)

*Primary Examiner* — Kip T Kotter
(74) *Attorney, Agent, or Firm* — WENDEROTH, LIND & PONACK, L.L.P.

(57) ABSTRACT

Provided is a bearing device for a vehicle wheel that is suitable in being able to prevent impairment in assemblability of the bearing device for a vehicle wheel to a knuckle without cost increase. A bearing device for a vehicle wheel (1) is provided with an inner member and an outer ring (2) which is an outer member having a vehicle-body-mounting flange part (2d), wherein the outer ring (2) has a pilot part (2e) disposed inward of the vehicle-body-mounting flange part (2d), and the pilot part (2e) has a fitting portion (2f) configured to be fitted to a knuckle (10) and a guiding portion (2g) having a diameter which gradually decreases inward from the inner-side end of the fitting portion (2f).

3 Claims, 9 Drawing Sheets

(52) U.S. Cl.
CPC ..... *B60B 2310/208* (2013.01); *B60B 2380/12* (2013.01); *B60B 2380/75* (2013.01); *F16C 2326/02* (2013.01)

(56) References Cited

U.S. PATENT DOCUMENTS

| | | | | |
|---|---|---|---|---|
| 6,354,952 | B1 * | 3/2002 | Boulton | F16B 21/18 |
| | | | | 464/145 |
| 7,824,106 | B2 † | 11/2010 | Hirai | |
| 8,777,492 | B2 | 7/2014 | Yamamoto et al. | |
| 11,015,651 | B2 | 5/2021 | Baba et al. | |
| 2001/0016520 | A1 * | 8/2001 | Sahashi | F16D 1/116 |
| | | | | 464/182 |
| 2003/0110860 | A1 * | 6/2003 | Okada | F16C 33/7896 |
| | | | | 73/593 |
| 2005/0223557 | A1 * | 10/2005 | Yasumura | B60B 27/0026 |
| | | | | 29/898.07 |
| 2007/0201783 | A1 | 8/2007 | Hirai et al. | |
| 2013/0076111 | A1 * | 3/2013 | Yamamoto | B60B 27/0084 |
| | | | | 301/109 |
| 2018/0258995 | A1 * | 9/2018 | Mitsuishi | F16C 33/7883 |
| 2019/0093703 | A1 | 3/2019 | Baba et al. | |

FOREIGN PATENT DOCUMENTS

| | | | | |
|---|---|---|---|---|
| CN | 204175803 | | 2/2015 | |
| DE | 102006040776 | † | 3/2008 | |
| DE | 102011121575 A1 | * | 6/2013 | ............ B60B 27/00 |
| DE | 10 2013 209 522 | | 8/2014 | |
| JP | 2001150909 | † | 6/2001 | |
| JP | 2003072308 A | * | 3/2003 | ............ F16C 19/187 |
| JP | 2005104356 | † | 4/2005 | |
| JP | 2005-256898 | | 9/2005 | |
| JP | 2007-022387 | | 2/2007 | |
| JP | 2007327587 | † | 12/2007 | |
| JP | 2008-168817 | | 7/2008 | |
| JP | 2008-223893 | | 9/2008 | |
| JP | 2011-240755 | | 12/2011 | |
| JP | 2015163818 A | * | 9/2015 | ......... B60B 27/0005 |
| JP | 2017161030 | † | 9/2017 | |
| WO | WO-2011118805 A1 | * | 9/2011 | ............ B60B 27/00 |

OTHER PUBLICATIONS

International Search Report issued Jun. 9, 2020 in International (PCT) Application No. PCT/JP2020/012368.

\* cited by examiner
† cited by third party

PRIOR ART

BEARING DEVICE FOR VEHICLE WHEEL

TECHNICAL FIELD

The present invention relates to a bearing device for a vehicle wheel.

BACKGROUND ART

In an outer member of a bearing device for a vehicle wheel, a pilot portion (inner-side end portion) is fitted to a knuckle constituting a suspension device, and a vehicle body mounting flange portion is fastened to the knuckle.

Here, in order to enhance bearing rigidity, a bearing device for a vehicle wheel in which a fitting gap between the pilot portion and the knuckle is reduced has been proposed (see, for example, Patent Literature 1).

In the bearing device for a vehicle wheel of Patent Literature 1, a cover is interposed between the pilot portion and the knuckle. In the cover, a cylindrical portion fitted to the pilot portion has a bellows shape and has a plurality of folds. Thus, when the vehicle body mounting flange portion is fastened to the knuckle, the cylindrical portion of the cover is compressed so that a preload is applied.

However, the cover of Patent Literature 1, which has a rust prevention function, requires an increase in cost. Further, as illustrated in FIG. 9, if a fitting gap C between a pilot portion P of an outer ring 200 and a knuckle 10 is too small, gouging easily occurs at a fitting portion 200f when the pilot portion P is fitted to an opening portion 10a of the knuckle 10. For this reason, the insertability of the pilot portion P deteriorates and bearing assemblability in a vehicle assembly line is impaired. In view of the above, in a fitting structure between the knuckle 10 and the pilot portion P, it is necessary to provide the fitting gap C of about several tenths of 1 mm.

CITATIONS LIST

Patent Literature

Patent Literature 1: JP-A 2007-22387 Gazette

SUMMARY OF INVENTION

Technical Problems

The present invention is made in view of the above circumstances, and an object of the present invention is to provide a suitable bearing device for a vehicle wheel capable of preventing the assemblability of the bearing device for a vehicle wheel to the knuckle from being impaired without increasing the cost.

Solutions to Problems

According to a first aspect of the present invention, there is provided a bearing device for a vehicle wheel, including:
an outer member having a plurality of rows of outer raceway surfaces on an inner periphery and a flange portion to which a vehicle body side member is attached;
an inner member including a hub ring including a small diameter step portion extending in an axial direction on an outer periphery and at least one inner ring press-fitted into the small diameter step portion of the hub ring, the inner member having a plurality of rows of inner raceway surfaces facing the plurality of rows of outer raceway surfaces on an outer periphery; and
a plurality of rows of rolling bodies rollably accommodated between the raceway surfaces of the inner member and the raceway surfaces of the outer member, in which
the outer member is provided with a pilot portion on a more inner side than the flange portion, and
the pilot portion has a fitting portion fitted to the vehicle body side member and a guide portion whose diameter gradually decreases from an inner-side end portion of the fitting portion toward an inner side.

According to a second aspect of the present invention, the guide portion has a forged surface.

According to a third aspect of the present invention, the guide portion has an axial cross-sectional shape that is a single linear shape or a plurality of linear shapes bent and connected to each other.

According to a fourth aspect of the present invention, the guide portion has an axial cross-sectional shape that is a curved shape of a single or a plurality of single radii of curvature.

According to a fifth aspect of the present invention, the guide portion has an axial cross-sectional shape that is a combination of curved shapes having a single or a plurality of compound curvatures.

Advantageous Effects of Invention

That is, according to the bearing device for a vehicle wheel of the present invention, a suitable bearing device for a vehicle wheel capable of preventing the assemblability of the bearing device for a vehicle wheel to a knuckle from being impaired, without increasing the cost, can be provided.

DESCRIPTION OF EMBODIMENTS

Hereinafter, a bearing device for a vehicle wheel 1, as a first embodiment of a bearing device for a vehicle wheel, will be described with reference to FIGS. 1 and 2.

Figure 1:
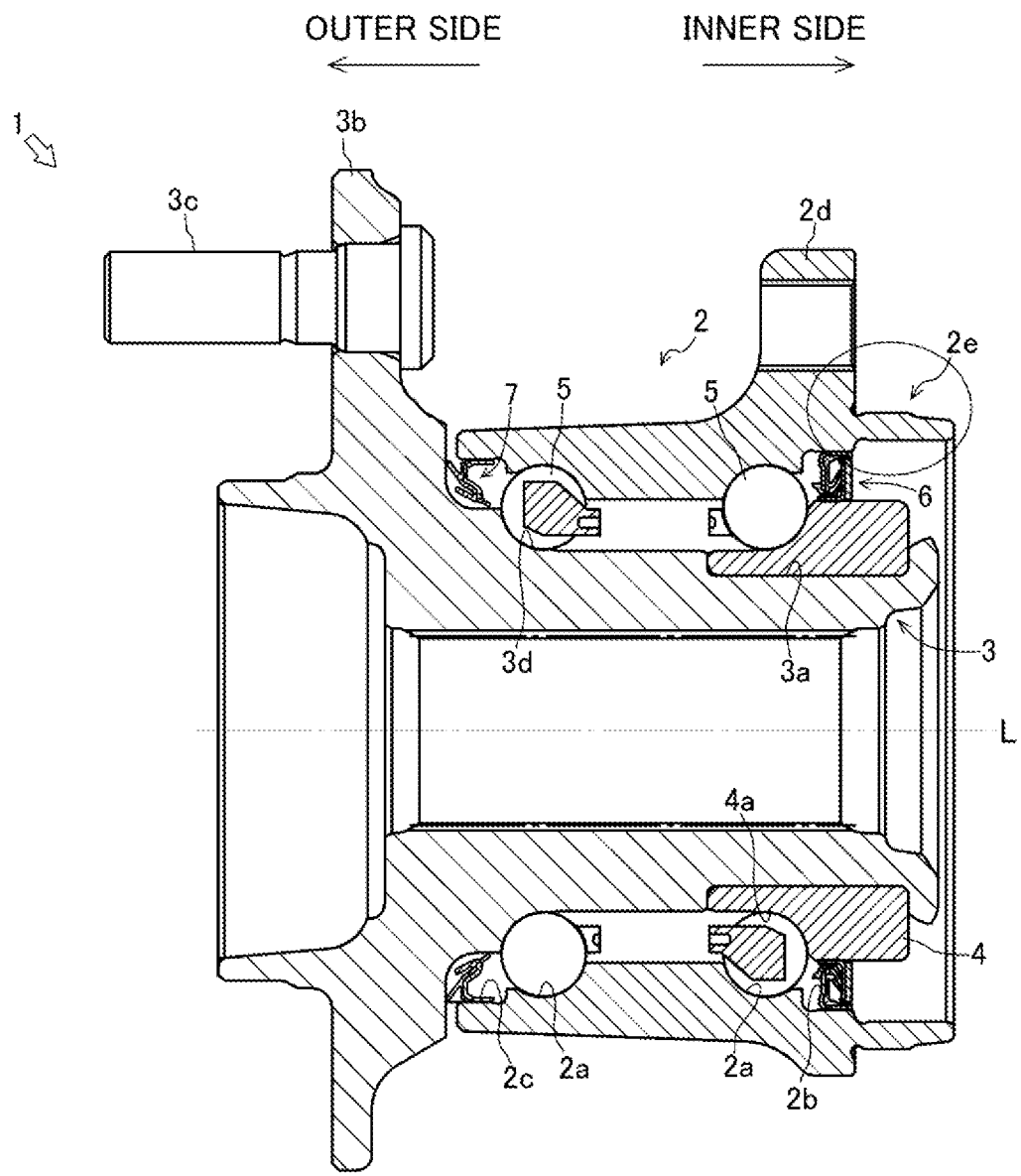
FIG. 1 is a cross-sectional view showing an overall configuration of a first embodiment of a bearing device for a vehicle wheel.

As illustrated in FIG. 1, the bearing device for a vehicle wheel 1 rotatably supports a wheel in a suspension device of a vehicle such as an automobile. The bearing device for a vehicle wheel 1 includes an outer ring 2, a hub ring 3, an inner ring 4, a rolling body 5, an inner-side seal member 6, and an outer-side seal member 7.

As shown in FIG. 1, the outer ring 2, which is an outer member, has a cylindrical shape and supports the hub ring 3 and the inner ring 4. A plurality of rows of outer raceway surfaces 2a are provided on an inner peripheral surface of the outer ring 2. An inner-side opening portion 2b, into which the inner-side seal member 6 can be fitted, is provided in an inner-side end portion of the outer ring 2. An outer-side opening portion 2c, into which the outer-side seal member 7 can be fitted, is provided in an outer-side end portion of the outer ring 2. A vehicle body mounting flange portion 2d for mounting on a knuckle 10, as an example of a vehicle body side member of the suspension device, is integrally provided on an outer peripheral surface of the outer ring 2.

An inner member includes the hub ring 3 and the inner ring 4. The hub ring 3 rotatably supports a wheel of a vehicle (not illustrated). An inner-side end portion of the hub ring 3 is provided with a small-diameter step portion 3a whose diameter is reduced on an outer peripheral surface. A vehicle wheel mounting flange portion 3b for mounting a wheel is formed in an outer-side end portion of the hub ring 3. A hub bolt 3c is inserted into the vehicle wheel mounting flange portion 3b. Further, an inner raceway surface 3d is provided on the outer side of an outer peripheral surface of the hub ring 3.

The inner ring 4 is press-fitted into an inner-side end portion (small-diameter step portion 3a) of the hub ring 3. An inner raceway surface 4a is provided on an outer peripheral surface of the inner ring 4. The inner ring 4 is fixed by caulking the inner-side end portion of the hub ring 3. That is, the inner ring 4 forms the inner raceway surface 4a on the inner side of the hub ring 3.

The two ball rows 5 as rolling bodies rotatably support the hub ring 3. The bearing device for a vehicle wheel 1 includes a double-row angular ball bearing including the outer ring 2, the hub ring 3, the inner ring 4, and the two ball rows 5. Note that the bearing device for a vehicle wheel 1 may include a double row tapered roller bearing.

Figure 2:
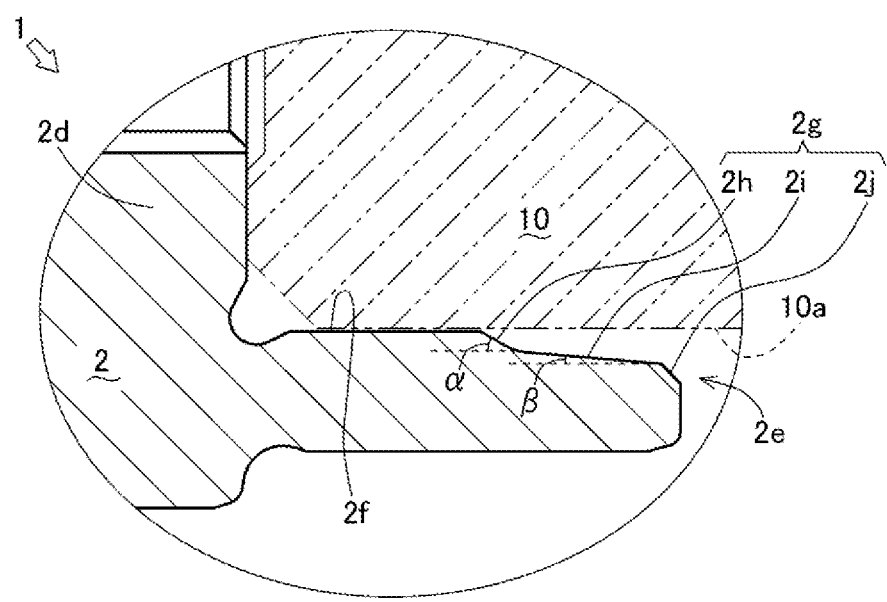
FIG. 2 is an enlarged cross-sectional view showing a pilot portion of an outer ring in the first embodiment of the bearing device for a vehicle wheel.

FIG. 2 illustrates a state in which the bearing device for a vehicle wheel 1 is fitted to the knuckle 10. Note that FIG. 2 is an enlarged view of a partial region on the inner side of the vehicle body mounting flange portion 2d of the outer ring 2.

As illustrated in FIG. 2, a pilot portion 2e is provided in the inner-side end portion of the outer ring 2. The pilot portion 2e has a substantially cylindrical shape around a rotation axis L (see FIG. 1) of the inner member 3, and the pilot portion 2e is fitted to the inner surface of the opening portion 10a of the knuckle 10.

The pilot portion 2e has the fitting portion 2f and a guide portion 2g on an outer peripheral surface of the pilot portion 2e. The fitting portion 2f is a cylindrical surface provided on the inner side of the vehicle body mounting flange portion 2d and parallel to the axial direction. The fitting portion 2f is a surface to be fitted into the opening portion 10a of the knuckle 10.

The guide portion 2g is a bent surface whose diameter gradually decreases from an inner-side end portion of the fitting portion 2f toward the inner side. When the fitting portion 2f is fitted into the opening portion 10a of the knuckle 10, the guide portion 2g guides the opening portion 10a to the fitting portion 2f. The guide portion 2g includes a first tapered surface 2h, a second tapered surface 2i, and a chamfered portion 2j.

The first tapered surface 2h is an inclined surface inclined at a predetermined inclination angle $\alpha$ with respect to the rotation axis L such that the diameter gradually decreases from the inner-side end portion of the fitting portion 2f toward the inner side. The second tapered surface 2i is an inclined surface whose diameter gradually decreases from an inner-side end portion of the first tapered surface 2h toward the inner side. The second tapered surface 2i is a more gently inclined surface than the first tapered surface 2h and is inclined at a predetermined inclination angle $\beta$ with respect to the rotation axis L. In the axial cross-sectional view, the relationship between the inclination angle $\alpha$ and the inclination angle $\beta$ is $\alpha > \beta$, and the first tapered surface 2h is a more steeply inclined surface than the second tapered surface 2i. For example, the inclination angle $\alpha$ is preferably $30° \pm 5°$, and the inclination angle $\beta$ is preferably $5° \pm 3°$. A boundary portion between the first tapered surface 2h and the second tapered surface 2i is preferably formed in an R shape in the axial cross-sectional view.

The chamfered portion 2j is a tapered surface whose diameter gradually decreases from an inner-side end portion of the second tapered surface 2i toward the inner side. The chamfered portion 2j is a portion obtained by C-chamfering or R-chamfering (C-chamfering in the present embodiment shown in FIG. 2) an outer peripheral edge corner portion in an inner-side end portion of the pilot portion 2e. Note that the C-chamfering is, for example, a process of cutting intersecting surface portions (corner portion) at 45 degrees. The R-chamfering is a process of forming intersecting surface portions (corner portion) into a round shape. Note that the C-chamfering or R-chamfering may be omitted.

As described above, the outer ring 2 of the bearing device for a vehicle wheel 1 includes the pilot portion 2e having the fitting portion 2f fitted to the knuckle 10 and the guide portion 2g that guides the opening portion 10a of the knuckle 10. Thus, when the pilot portion 2e is fitted to the opening portion 10a of the knuckle 10, an outer-side end portion of the opening portion 10a of the knuckle 10 is smoothly guided to the fitting portion 2f by the guide portion 2g, so that the insertability of the pilot portion 2e into the knuckle 10 is improved. Therefore, even in a case where the fitting gap between the knuckle 10 and the fitting portion 2f of the pilot portion 2e is reduced in order to improve the bearing rigidity, it is possible to prevent the assemblability of the bearing device for a vehicle wheel 1 to the knuckle 10 from being impaired.

In the bearing device for a vehicle wheel 1, if the fitting gap between an inner peripheral surface of the opening portion 10a of the knuckle 10 and the fitting portion 2f of the pilot portion 2e is reduced, the fitting portion 2f and the opening portion 10a come into contact with each other earlier when a load is applied to the bearing, and the load can be received by this contact portion. Further, even in a case where a large moment load is applied at the time of turning of the vehicle, the deformation of the outer ring 2 is suppressed, which is useful for improving the bearing rigidity and thus for maintaining the linearity of the bearing rigidity. Therefore, in the bearing device for a vehicle wheel 1, it is possible to achieve both improvement in the assemblability to the knuckle 10 and improvement in the bearing rigidity. Further, since the guide portion 2g is a part of the pilot portion 2e, it is not necessary to use a cover having the rust prevention property as in the conventional art, and an increase in cost can be prevented.

Next, second to seventh embodiments will be described as a variation of the bearing device for a vehicle wheel according to the present invention with reference to the drawings. In the description of each embodiment below, portions added or changed in each embodiment will be mainly described, and other same components or portions or components or portions having similar functions will be denoted by the same reference numerals, and their description will not be repeated.

Figure 3:
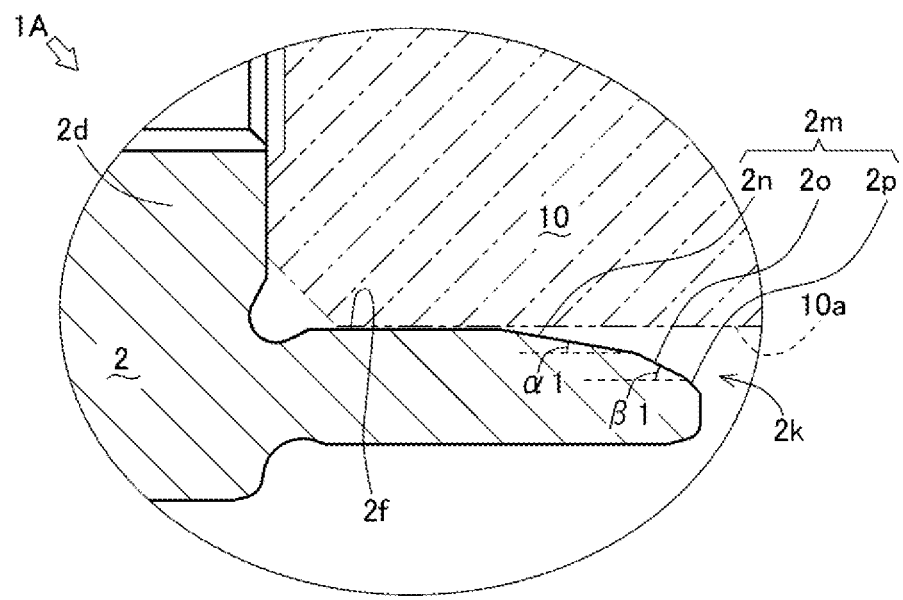
FIG. 3 is an enlarged cross-sectional view showing the pilot portion of the outer ring in a second embodiment of the bearing device for a vehicle wheel.

Next, a pilot portion 2k of a bearing device for a vehicle wheel 1A as the second embodiment of the bearing device for a vehicle wheel according to the present invention will be described with reference to FIG. 3.

The pilot portion 2k has the fitting portion 2f and a guide portion 2m on an outer peripheral surface of the pilot portion 2k. The guide portion 2m includes a first tapered surface 2n, a second tapered surface 2o, and a chamfered portion 2p. In the pilot portion 2k, in the axial cross-sectional view, a relationship between an inclination angle α1 of the first tapered surface 2n and an inclination angle β1 of the second tapered surface 2o is α1<β1, and the first tapered surface 2n is a gentler surface than the second tapered surface 2o. A boundary portion between the first tapered surface 2n and the second tapered surface 2o has a shape projecting toward the radially outer side. In this manner, the same functions and effects as those of the bearing device for a vehicle wheel according to the first embodiment are obtained.

Figure 4:
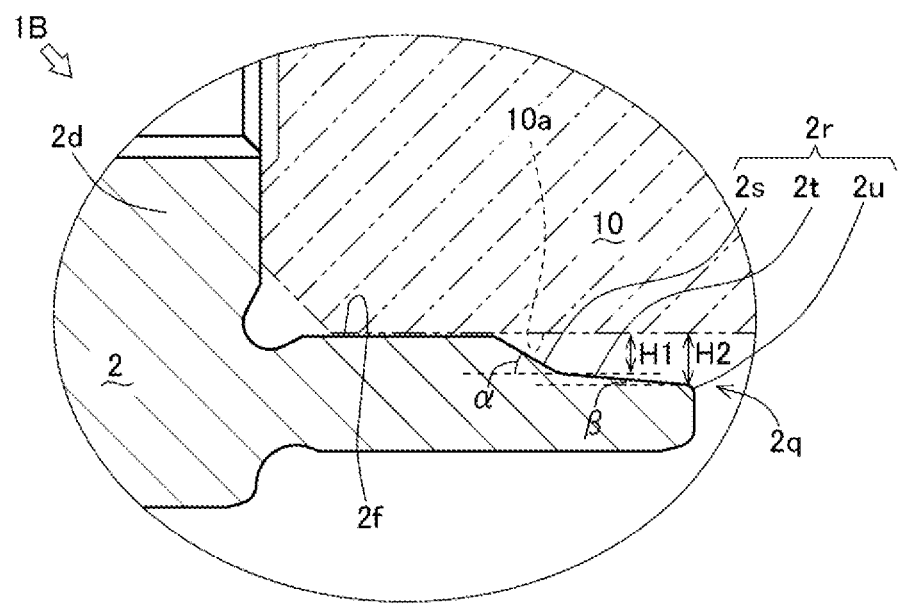
FIG. 4 is an enlarged cross-sectional view showing the pilot portion of the outer ring in a third embodiment of the bearing device for a vehicle wheel.

Next, a pilot portion 2q of a bearing device for a vehicle wheel 1B as a third embodiment of the bearing device for a vehicle wheel according to the present invention will be described with reference to FIG. 4.

The pilot portion 2q has the fitting portion 2f and a guide portion 2r on an outer peripheral surface of the pilot portion 2q. The guide portion 2r includes a first tapered surface 2s, a second tapered surface 2t, and a chamfered portion 2u. In the pilot portion 2q, in the axial cross-sectional view, a relationship between the inclination angle α of the first tapered surface 2s and an inclination angle β of the second tapered surface 2t is α>β, and the first tapered surface 2s is a steeper surface than the second tapered surface 2t. A radial interval H1 between an inner-side end portion of the first tapered surface 2s according to the present embodiment and the inner peripheral surface of the opening portion 10a of the knuckle 10 is larger than a radial interval between the first tapered surface 2h and the knuckle 10 according to the first embodiment. A radial interval H2 between an inner-side end portion of the second tapered surface 2t and the inner peripheral surface of the opening portion 10a of the knuckle 10 is larger than a radial interval between the second tapered surface 2i and the knuckle 10 according to the first embodiment.

In the present embodiment as well, the same functions and effects as those of the bearing device for a vehicle wheel according to the first embodiment are obtained. Furthermore, in the bearing device for a vehicle wheel 1B, since the radial intervals H1 and H2 are larger than those of the bearing device for a vehicle wheel 1 of the first embodiment, it is easy to position the pilot portion 2q with respect to the opening portion 10a of the knuckle 10, and the outer-side end portion of the opening portion 10a of the knuckle 10 is more smoothly guided to the fitting portion 2f by a guide portion 2r. As described above, the bearing device for a vehicle wheel 1 according to the first embodiment, the bearing device for a vehicle wheel 1A according to the second embodiment, and the bearing device for a vehicle wheel 1B according to the third embodiment have a composite inclined surface formed by continuously providing a plurality of tapered surfaces (inclined surfaces) as the guide portions from the outer side to the inner side.

Figure 5:
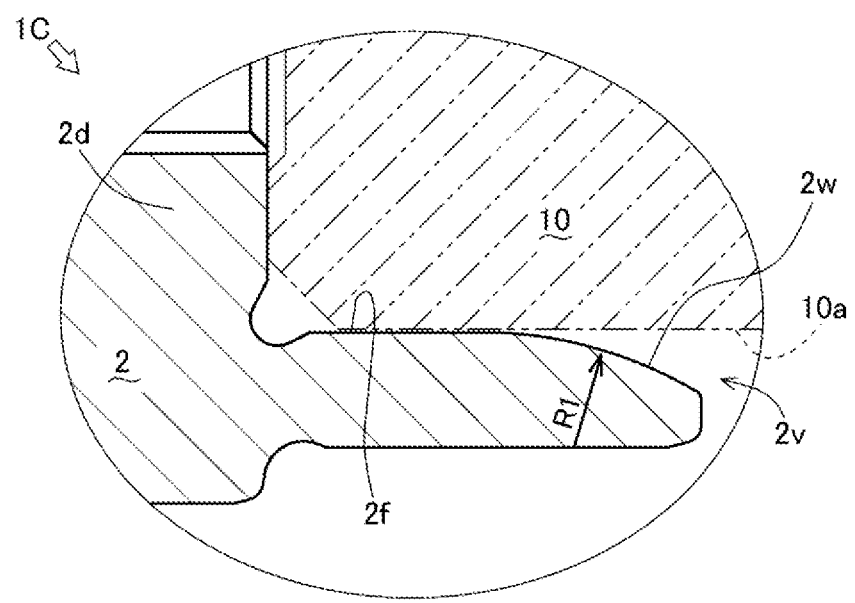
FIG. 5 is an enlarged cross-sectional view showing the pilot portion of the outer ring in a fourth embodiment of the bearing device for a vehicle wheel.

Next, a pilot portion 2v of a bearing device for a vehicle wheel 1C as a fourth embodiment of the bearing device for a vehicle wheel according to the present invention will be described with reference to FIG. 5.

In the pilot portion 2v, a guide portion 2w is a curved surface that is curved in an arc shape whose diameter gradually decreases from the inner-side end portion of the fitting portion 2f toward the inner side. The guide portion 2w extending from the inner-side end portion of the fitting portion 2f to the inner-side end portion of the pilot portion 2v is provided. The guide portion 2w has a shape projecting toward the radially outer side. In this manner, the same functions and effects as those of the bearing device for a vehicle wheel according to the first embodiment are obtained.

Figure 6:
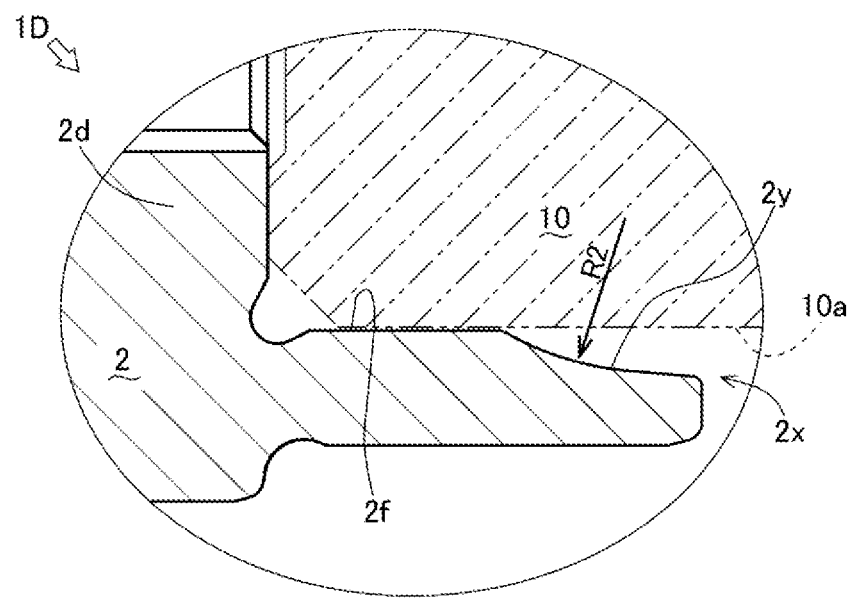
FIG. 6 is an enlarged cross-sectional view showing the pilot portion of the outer ring in a fifth embodiment of the bearing device for a vehicle wheel.

Next, a pilot portion 2x of a bearing device for a vehicle wheel 1D as a fifth embodiment of the bearing device for a vehicle wheel according to the present invention will be described with reference to FIG. 6.

The pilot portion 2x is a variation of the pilot portion 2v. In the present embodiment, a guide portion 2y has a shape projecting toward the radially inner side. In this manner, the same functions and effects as those of the bearing device for a vehicle wheel according to the fourth embodiment are obtained. As described above, the bearing device for a vehicle wheel 1C according to the fourth embodiment and the bearing device for a vehicle wheel 1D according to the fifth embodiment have a single projection and recess having an R shape in axial cross-sectional view as a guide portion.

Figure 7:
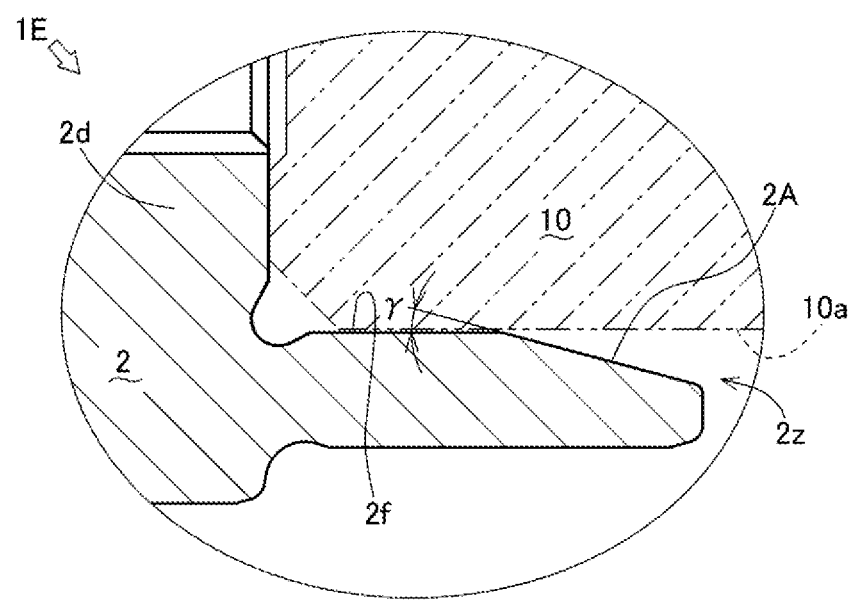
FIG. 7 is an enlarged cross-sectional view showing the pilot portion of the outer ring in a sixth embodiment of the bearing device for a vehicle wheel.

Next, a pilot portion 2z of a bearing device for a vehicle wheel 1E as a sixth embodiment of the bearing device for a vehicle wheel according to the present invention will be described with reference to FIG. 7.

In the pilot portion 2z according to the present embodiment, a guide portion 2A is-102g is inclined to the radially inner side from the inner-side end portion of the fitting portion 2f toward the inner side. The guide portion 2A is a tapered surface having a predetermined inclination angle γ so as to have a diameter that is gradually reduced. The guide portion 2A extends from the inner-side end portion of the fitting portion 2f to the inner-side end portion of the pilot portion 2z. In this manner, the same functions and effects as those of the bearing device for a vehicle wheel according to the first embodiment are obtained.

Figure 8:
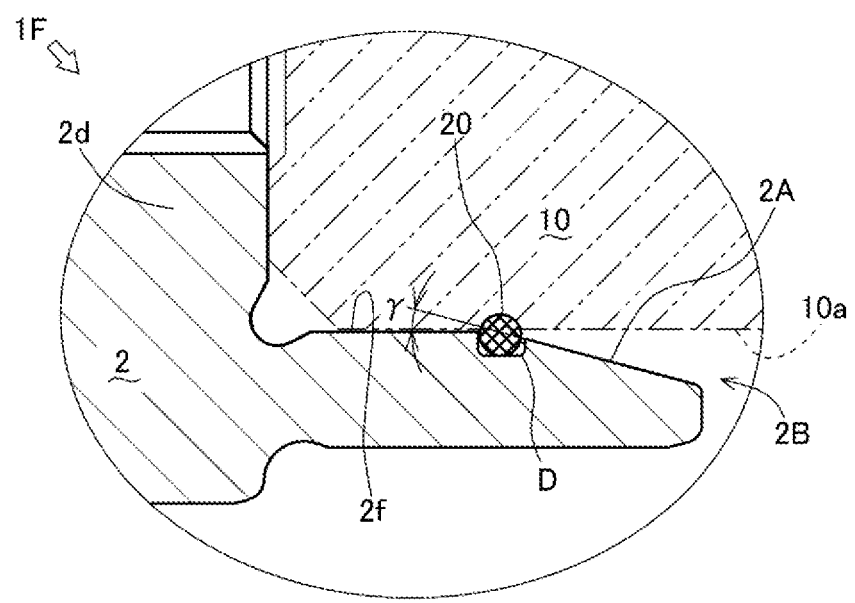
FIG. 8 is an enlarged cross-sectional view showing the pilot portion of the outer ring in a seventh embodiment of the bearing device for a vehicle wheel.
Figure 9:
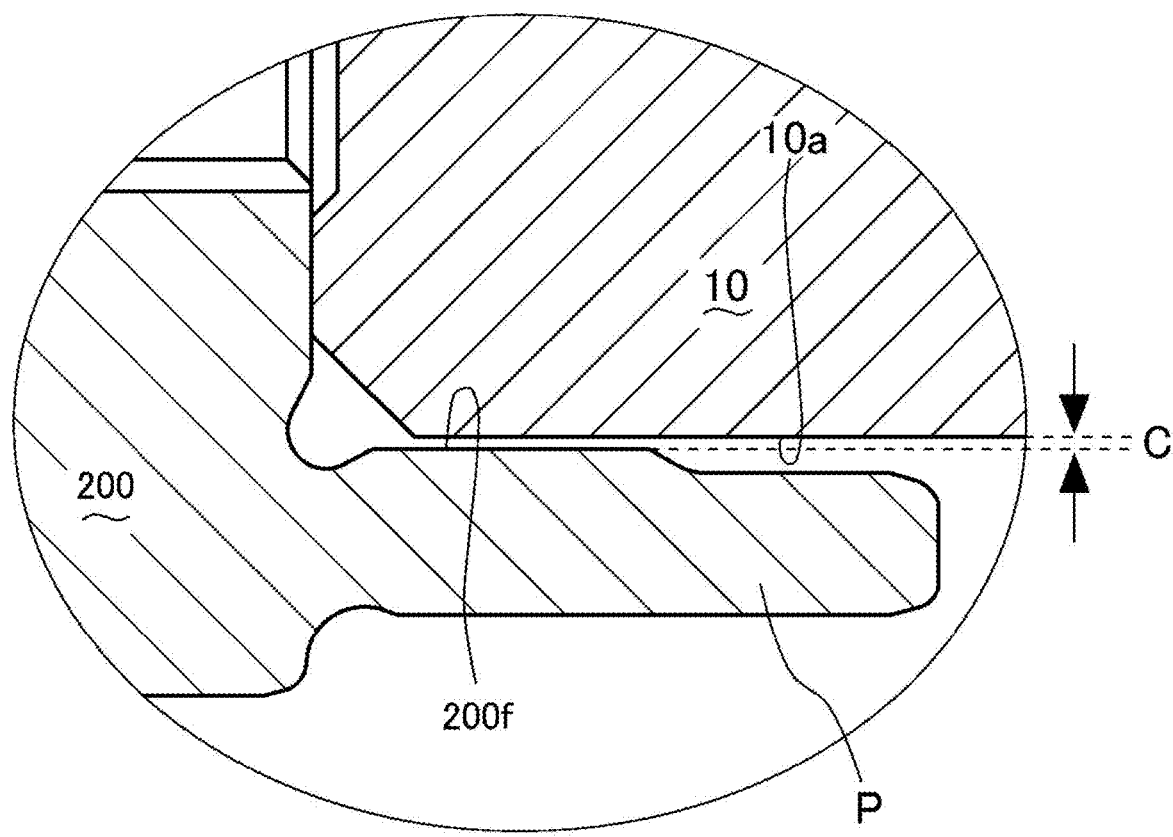
FIG. 9 is an enlarged cross-sectional view showing a stepped pilot portion of an outer ring in a conventional bearing device for a vehicle wheel.

Next, a pilot portion 2B of a bearing device for a vehicle wheel 1F as a seventh embodiment of the bearing device for a vehicle wheel according to the present invention will be described with reference to FIG. 8.

The pilot portion 2B according to the present embodiment is a variation of the pilot portion 2z according to the sixth embodiment. A recessed groove portion D is provided in a boundary portion between the fitting portion 2f and the guide portion 2A (axial center portion of the pilot portion 2B). The groove portion D is formed by the boundary portion recessed to the radially inner side. An elastic member (here, an O-ring) 20 is fitted into the groove portion D.

In the present embodiment as well, the same functions and effects as those of the bearing device for a vehicle wheel according to the first embodiment are obtained. Further, the groove portion D, into which the O-ring 20 of the pilot portion 2B is fitted, is provided; therefore, the O-ring 20 elastically contacts the inner peripheral surface of the opening portion 10a of the knuckle 10, so that it is possible to prevent intrusion of dust or the like. As described above, the bearing device for a vehicle wheel 1E of the sixth embodiment and the bearing device for a vehicle wheel 1F of the seventh embodiment have a single tapered surface (inclined surface) as the guide portion.

Further, the guide portions 2g, 2m, 2r, 2w, 2y, and 2A according to the present embodiment are preferably composed of an unprocessed forged surface instead of being finished by machining (e.g. lathe turning). Since the working process can be omitted in this manner, the outer ring 2 can be manufactured at low cost.

Further, in the bearing devices for a vehicle wheel 1C and 1D described above, each of the guide portions 2w and 2y has a curved shape with a single (one) single radius of curvature (a radius of curvature R1 in the bearing device for a vehicle wheel 1C, and a radius of curvature R2 in the bearing device for a vehicle wheel 1D) in the axial cross-sectional shape. Further, a plurality of curves having a single curvature radius may be continuously provided. Further, in addition to the guide portion of the present embodiment, the guide portion may be configured such that the guide portion has a combination of curved shapes having a single or a plurality of compound curvatures in the axial cross-sectional shape.

Note that the axial cross-sectional shape of the guide portion in the pilot portion may be configured by combining a linear shape and a curved shape in a composite manner.

Further, the above-described embodiments are merely representative forms of the present invention, and various modifications can be made without departing from the scope of the present invention.

INDUSTRIAL APPLICABILITY

The present invention is applicable to a bearing device for a vehicle wheel.

REFERENCE SIGNS LIST 1 bearing device for a vehicle wheel
2 outer ring
2a outer raceway surface
2c outer-side opening portion
2d vehicle body mounting flange portion
2e pilot portion
2f fitting portion
2g guide portion
3 hub ring
3a small-diameter step portion
4 inner ring
4a inner raceway surface
5 ball row
10 knuckle (vehicle body side member)

The invention claimed is:

1. A bearing device for a vehicle wheel, the bearing device comprising:
    an outer member having a plurality of rows of outer raceway surfaces on an inner periphery thereof and a flange portion to which a vehicle body side member is to be attached;
    an inner member including a hub ring including a small diameter step portion extending in an axial direction on an outer periphery of the hub ring and at least one inner ring press-fitted into the small diameter step portion of the hub ring, the inner member having a plurality of rows of inner raceway surfaces on an outer periphery thereof facing the plurality of rows of outer raceway surfaces; and
    a plurality of rows of rolling bodies rollably accommodated between the raceway surfaces of the inner member and the raceway surfaces of the outer member, wherein
    the outer member is provided with a pilot portion on a more inner side than the flange portion,
    the pilot portion has a fitting portion to be fitted to the vehicle body side member and a guide portion whose diameter gradually decreases from an inner-side end portion of the fitting portion toward an inner side,
    the guide portion includes a first tapered surface, a second tapered surface, and a chamfered portion,
    the first tapered surface is provided from the inner-side end portion of the fitting portion toward the inner side,
    the second tapered surface is provided from an inner-side end portion of the first tapered surface toward the inner side,
    the chamfered portion is provided at an inner-side end portion of the second tapered surface, and
    an inclination angle α of the first tapered surface with respect to a rotation axis of the bearing device is larger than an inclination angle β of the second tapered surface with respect to the rotation axis of the bearing device.

2. The bearing device for a vehicle wheel according to claim 1, wherein the guide portion has a forged surface.

3. The bearing device for a vehicle wheel according to claim 1, wherein the guide portion has an axial cross-sectional shape that is a plurality of linear shapes bent and connected to each other.

* * * * *